(12) United States Patent
Guo

(10) Patent No.: US 9,960,991 B2
(45) Date of Patent: May 1, 2018

(54) METHOD, APPARATUS AND SYSTEM FOR DETERMINING SERVICE TRANSMISSION PATH

(71) Applicant: Huawei Technologies Co., Ltd., Shenzhen (CN)

(72) Inventor: Dayong Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 15/002,673

(22) Filed: Jan. 21, 2016

(65) Prior Publication Data

US 2016/0142282 A1    May 19, 2016

Related U.S. Application Data

(63) Continuation of application No. PCT/CN2014/081058, filed on Jun. 28, 2014.

(30) Foreign Application Priority Data

Jul. 22, 2013   (CN) .......................... 2013 1 0309188

(51) Int. Cl.
*H04L 12/66*        (2006.01)
*H04L 12/721*       (2013.01)
(Continued)

(52) U.S. Cl.
CPC ........ *H04L 45/123* (2013.01); *H04L 12/6418* (2013.01); *H04L 45/02* (2013.01);
(Continued)

(58) Field of Classification Search
CPC ... H04L 12/28; H04L 12/2887; H04L 12/289; H04L 12/2894
(Continued)

(56) References Cited

U.S. PATENT DOCUMENTS 9,178,796 B2 * 11/2015 Previdi ................. H04L 41/12
9,258,238 B2 *  2/2016 Bahadur ............... H04L 47/125
(Continued)

FOREIGN PATENT DOCUMENTS

CN    1602089 A     3/2005
CN    1713586 A    12/2005
(Continued)

OTHER PUBLICATIONS

Vasseur et al., "Path Computation Element (PCE) Communication Protocol (PCEP)," Network Working Group, Request for Comments: 5440, pp. 1-87, IETF Trust, Reston, Virginia (Mar. 2009).
(Continued)

*Primary Examiner* — Dmitry H Levitan
(74) *Attorney, Agent, or Firm* — Leydig, Voit & Mayer, Ltd.

(57) ABSTRACT

The present disclosure discloses a method, an apparatus and a system for determining a service transmission path. The method includes: receiving a service chaining object sent by a client device based on an expanded path computation element communication protocol (PCEP), wherein the service chaining object includes service processing capacities that service nodes need to provide when transmitting a service in a network; determining at least one service node matched with the service chaining object in the network according to service processing capacities that service nodes in pre-stored service node attribute information are capable of providing; and generating a service transmission path based on the determined service nodes, for transmitting the service initiated by the client device. The problems of large flow pressure and low utilization rate of the service nodes deployed in the network may be well solved.

13 Claims, 5 Drawing Sheets

(51) Int. Cl.
H04L 12/64 (2006.01)
H04L 12/755 (2013.01)
H04L 29/08 (2006.01)
H04L 12/771 (2013.01)
H04L 12/751 (2013.01)
H04L 12/933 (2013.01)
H04L 12/931 (2013.01)

(52) U.S. Cl.
CPC ............ H04L 45/021 (2013.01); H04L 45/38 (2013.01); H04L 45/56 (2013.01); H04L 49/15 (2013.01); H04L 49/35 (2013.01); H04L 67/327 (2013.01)

(58) Field of Classification Search
USPC .......................... 370/355, 386, 388, 389, 437
See application file for complete search history.

(56) References Cited

U.S. PATENT DOCUMENTS

| | | | | |
|---|---|---|---|---|
| 9,413,634 | B2* | 8/2016 | Nadeau | H04L 45/124 |
| 9,634,867 | B2* | 4/2017 | Lee | H04L 12/6418 |
| 2011/0081147 | A1 | 4/2011 | Lee et al. | |
| 2011/0199939 | A1 | 8/2011 | Zi et al. | |
| 2012/0114329 | A1 | 5/2012 | Lee et al. | |
| 2012/0210005 | A1* | 8/2012 | Chamania | H04L 41/5054 709/226 |
| 2013/0007266 | A1 | 1/2013 | Jocha et al. | |
| 2013/0047026 | A1 | 2/2013 | Szabo et al. | |
| 2015/0326473 | A1* | 11/2015 | Dunbar | H04L 12/4633 370/392 |
| 2015/0381515 | A1* | 12/2015 | Mattson | H04L 41/145 707/609 |

FOREIGN PATENT DOCUMENTS

| | | |
|---|---|---|
| CN | 101729376 A | 6/2010 |
| CN | 102124697 A | 6/2011 |
| CN | 102137017 A | 7/2011 |
| CN | 102752186 A | 10/2012 |
| EP | 2352261 A1 | 8/2011 |

OTHER PUBLICATIONS

Chen et al., "Software Defined Networks Use Case for Virtual Connection and Network on Demand," Network Working Group, Internet-Draft, draft-mm-sdn-vc-vn-on-demand-use-case-00, pp. 1-9, IETF Trust, Reston, Virginia (Jul. 9, 2012).

* cited by examiner

METHOD, APPARATUS AND SYSTEM FOR DETERMINING SERVICE TRANSMISSION PATH

CROSS-REFERENCE TO RELATED APPLICATIONS

This application is a continuation of International Patent Application No. PCT/CN2014/081058, filed on Jun. 28, 2014, which claims priority to Chinese Patent Application No. 201310309188.3, filed on Jul. 22, 2013, both of which are hereby incorporated by reference in their entireties.

TECHNICAL FIELD

The present disclosure relates to the technical field of network communications, and particularly, to a method, an apparatus and a system for determining a service transmission path.

BACKGROUND

A variety of service nodes are generally deployed in a service center or a network edge point of presence (PoP) provided by a network provider. The service nodes refer to nodes with different functions and capable of providing service processing capacities of 4-7 layers for a network user. When being processed, a service transmitted in the network need to pass through a variety of different service nodes in turn according to a certain sequence.

As shown in FIG. 1, the network user (network user A as shown in FIG. 1) needs to customize a network service from a server device (which may be provided by the network provider) and then transmit a service according to the customized network service. Since the service nodes in the network are statically connected, all the services corresponding to a network user need to serially pass through all the service nodes in turn. In this way, in terms of the service nodes in the network, a large amount of unnecessary flow flows through the service nodes, resulting in large flow and low utilization rate of the service nodes.

In order to solve the problems of large flow pressure of the service nodes deployed in the network and low utilization rate of the service nodes, a technical solution of service chaining is provided. On the premise of meeting requirements of a service, the service nodes through which the service flows during transmission are flexibly controlled to avoid the service to flow through unnecessary service nodes when being transmitted in the network. A sequence formed by the service nodes corresponding to service transmission selected according to the service may be called a service chaining. The service chaining enables the network user to customize the service according to demand and pay according to the customized service. Internet engineering task force (IETF) proposes determining a transmission path of a service in a network based on a layer 3 virtual private network (L3VPN), specifically as follows: the transmission path of the service in the network is changed in a manner of manually configuring a provider edge (PE) router forwarding table, such that the service may pass through the set service nodes in sequence according to the configured router forwarding table. But in this manner, in terms of the network user customizing the service, the network user knows nothing about the specific locations of the service nodes in the network, and thus the determined transmission path of the service in the network could not represent the sequence of the service nodes in the network. Under this condition, when being transmitted, the service in the network still need to serially flow through the service nodes in turn, and thus the problems of large flow pressure and low utilization rate of the service nodes deployed in the network could not be well solved, and the efficiency of changing the transmission path of the service by means of manually configuring the PE router forwarding table is low.

To sum up, the general methods of determining the service transmission path could not well solve the problems of large flow pressure and low utilization rate of the service nodes deployed in the network.

SUMMARY

The present disclosure provides a method, apparatus and system for determining a service transmission path and a server device, which may be used for well solving the problems of large flow pressure and low utilization rate of service nodes deployed in a network.

In a first aspect, a method for determining a service transmission path is provided, including: receiving a service chaining object sent by a client device based on an expanded path computation element communication protocol (PCEP), wherein the service chaining object includes service processing capacities which service nodes need to provide when transmitting a service in a network; determining at least one service node matched with the service chaining object in the network according to service processing capacities which service nodes in pre-stored service node attribute information are capable of providing; and generating a service transmission path based on the determined service nodes, for transmitting the service initiated by the client device.

In a first possible implementation manner of the first aspect, the service chaining object further includes processing priorities corresponding to the service processing capacities which service nodes need to provide; the generating a service transmission path based on the determined service nodes includes: generating the service transmission path based on the processing priorities corresponding to the service processing capacities which the determined service nodes are capable of providing respectively.

In combination with the first aspect or the first possible implementation manner of the first aspect, in a second possible implementation manner of the first aspect, the generating a service transmission path based on the determined service nodes includes: when there are multiple service nodes capable of providing the same service processing capacity in the determined service nodes, for each service node in the service nodes providing the same service processing capacity, determining a length of service transmission path passing through the service node, and generating a service transmission path with the minimum length according to the determined length of each service transmission path; and/or, when there are multiple service nodes capable of providing the same service processing capacity in the determined service nodes, selecting a service node with the minimum load according to a load of each service node providing the same service processing capacity, respectively, and generating the service transmission path based on the selected service node.

In combination with any one of the first aspect, the first possible implementation manner of the first aspect and the second possible implementation manner of the first aspect, in a third possible implementation manner of the first aspect, after generating the service transmission path, the method further includes: determining a node identifier corresponding to each service node included in the generated service transmission path according to the service node attribute information; and obtaining network topology information; marking and connecting the service nodes, corresponding to the determined node identifiers, in the obtained network topology information.

In a second aspect, a method for determining a service transmission path is provided, including: determining a service chaining object of a service to be transmitted in a network, wherein the service chaining object includes service processing capacities which service nodes need to provide when transmitting the service in the network; sending the determined service chaining object to a server device based on an expanded path computation element communication protocol (PCEP); and transmitting the initiated service on the service transmission path generated by the server device according to the service chaining object.

In a first possible implementation manner of the second aspect, the service chaining object further includes processing priorities corresponding to the service processing capacities which service nodes need to provide.

In a third aspect, an apparatus for determining a service transmission path is provided, including: a receiving unit, configured to receive a service chaining object sent by a client device based on an expanded path computation element communication protocol (PCEP) and transmit the service chaining object to a determining unit, wherein the service chaining object includes service processing capacities which service nodes need to provide when transmitting a service in a network; the determining unit, configured to obtain the service chaining object transmitted by the receiving unit, determine at least one service node matched with the service chaining object in the network according to service processing capacities which service nodes in pre-stored service node attribute information are capable of providing, and transmit the determined service nodes to a service transmission path generating unit; and the service transmission path generating unit, configured to obtain the determined service nodes transmitted by the determining unit, and generate a service transmission path based on the determined service nodes, for transmitting the service initiated by the client device.

In a first possible implementation manner of the third aspect, the service chaining object further includes processing priorities corresponding to the service processing capacities which the service nodes need to provide; the service transmission path generating unit is configured to generate the service transmission path based on the processing priorities corresponding to the service processing capacities which the determined service nodes are capable of providing respectively.

In combination with the third aspect or the first possible implementation manner of the third aspect, in a second possible implementation manner of the third aspect, the service transmission path generating unit is configured to, when there are multiple service nodes capable of providing the same service processing capacity in the determined service nodes, for each service node in the service nodes providing the same service processing capacity, determine a length of service transmission path passing through the service node, and generate a service transmission path with the minimum length according to the determined length of each service transmission path; and/or, when there are multiple service nodes capable of providing the same service processing capacity in the determined service nodes, selecting a service node with the minimum load according to a load of each service node providing the same service processing capacity, respectively, and generate the service transmission path based on the selected service node.

In combination with any one of the third aspect, the first possible implementation manner of the third aspect and the second possible implementation manner of the third aspect, in a third possible implementation manner of the third aspect, the service transmission path generating unit is further configured to determine a node identifier corresponding to each service node included in the generated service transmission path according to the service node attribute information; and obtain network topology information; mark and connect the service nodes corresponding to the determined node identifiers in the obtained network topology information.

In a fourth aspect, an apparatus for determining a service transmission path is provided, including: a determining unit, configured to determine a service chaining object of a service to be transmitted in a network, and transmit the determined service chaining object to a sending unit, wherein the service chaining object includes service processing capacities which service nodes need to provide when transmitting the service in the network; the sending unit, configured to obtain the service chaining object transmitted by the determining unit, and send the determined service chaining object to a server device based on an expanded path computation element communication protocol (PCEP); and a service transmission unit, configured to transmit the initiated service on the service transmission path generated by the server device according to the service chaining object.

In a first possible implementation manner of the fourth aspect, the service chaining object determined by the determining unit further includes processing priorities corresponding to the service processing capacities which the service nodes need to provide.

In a fifth aspect, a system for determining a service transmission path is provided, including: a server device and a client device, wherein the client device is configured to determine a service chaining object of a service to be transmitted in a network, and send the determined service chaining object to the server device based on an expanded path computation element communication protocol (PCEP), wherein the service chaining object includes service processing capacities which service nodes need to provide when transmitting the service in the network; and transmit the initiated service on the service transmission path generated by the server device according to the service chaining object; the server device is configured to receive the service chaining object sent by the client device based on the expanded path computation element communication protocol (PCEP), determine at least one service node matched with the service chaining object in the network according to service processing capacities which service nodes in pre-stored service node attribute information are capable of providing, and generate the service transmission path based on the determined service nodes, for transmitting the service initiated by the client device.

In a first possible implementation manner of the fifth aspect, the service chaining object further includes processing priorities corresponding to the service processing capacities which service nodes need to provide; the server device is configured to generate the service transmission path based on the processing priorities corresponding to the service processing capacities which the determined service nodes are capable of providing respectively.

In combination with the fifth aspect or the first possible implementation manner of the fifth aspect, in a second possible implementation manner of the fifth aspect, the server device is configured to, when there are multiple service nodes capable of providing the same service processing capacity in the determined service nodes, for each service node in the service nodes providing the same service processing capacity, determine a length of the service transmission path passing through the service node, and generate a service transmission path with the minimum length according to the determined length of each service transmission path; and/or, when there are multiple service nodes capable of providing the same service processing capacity in the determined service nodes, select a service node with the minimum load according to a load of each service node providing the same service processing capacity, respectively, and generate the service transmission path based on the selected service node.

In combination with any one of the fifth aspect, the first possible implementation manner of the fifth aspect and the second possible implementation manner of the fifth aspect, in a third possible implementation manner of the fifth aspect, the server device is further configured to determine a node identifier corresponding to each service node included in the generated service transmission path according to the service node attribute information; and obtain network topology information; mark and connect the service nodes, corresponding to the determined node identifiers, in the obtained network topology information.

In a sixth aspect, a server device is provided, including an interface, a memory and a signal processor. The interface, the memory and the signal processor are connected and transmit data through a bus. The interface is configured to receive a service chaining object sent by a client device based on an expanded path computation element communication protocol (PCEP) and transmit the service chaining object to the signal processor, wherein the service chaining object includes service processing capacities which service nodes need to provide when transmitting a service in a network. The memory is configured to store a program instruction and transmit the stored program instruction to the signal processor. And, the memory is further configured to store the service processing capacities which service nodes in pre-stored service node attribute information are capable of providing. The signal processor is configured to obtain the program instruction stored in the memory, obtain the service node attribute information stored in the memory and perform the following operations according to the obtained program instruction: obtaining the service chaining object transmitted by the interface, determining at least one service node matched with the service chaining object in the network according to the service processing capacities which service nodes in the obtained service node attribute information are capable of providing, and generating a service transmission path based on the determined service nodes, for transmitting the service initiated by the client device.

In a first possible implementation manner of the sixth aspect, the service chaining object further includes processing priorities corresponding to the service processing capacities which the service nodes need to provide; the above-mentioned signal processor is configured to generate the service transmission path based on the processing priorities corresponding to the service processing capacities which the determined service nodes are capable of providing respectively.

In combination with the sixth aspect or the first possible implementation manner of the sixth aspect, in a second possible implementation manner of the sixth aspect, the above-mentioned signal processor is configured to, when there are multiple service nodes capable of providing the same service processing capacity in the determined service nodes, for each service node in the service nodes providing the same service processing capacity, determining a length of service transmission path passing through the service node, and generating a service transmission path with the minimum length according to the determined length of each service transmission path; and/or, when there are multiple service nodes capable of providing the same service processing capacity in the determined service nodes, selecting a service node with the minimum load according to a load of each service node providing the same service processing capacity, respectively, and generating the service transmission path based on the selected service node.

In combination with any one of the sixth aspect, the first possible implementation manner of the sixth aspect and the second possible implementation manner of the sixth aspect, in a third possible implementation manner of the sixth aspect, the signal processor is further configured to determining a node identifier corresponding to each service node included in the generated service transmission path according to the service node attribute information; and obtaining network topology information; and marking and connecting the service nodes, corresponding to the determined node identifiers, in the obtained network topology information.

In a seventh aspect, a server device is provided, including a signal processor and an interface, wherein the signal processor and the interface are connected and transmit data through a bus. The signal processor is configured to perform the following operations according to a program instruction: determining a service chaining object of a service to be transmitted in a network and transmitting the determined service chaining object to the interface, wherein the service chaining object includes service processing capacities which service nodes need to provide when transmitting the a service in the network; and transmitting the initiated service on the service transmission path generated by the server device according to the service chaining object. The interface is configured to obtain the service chaining object transmitted by the signal processor and send the determined service chaining object to the server device based on an expanded path computation element communication protocol (PCEP).

In a first possible implementation manner of the seventh aspect, the service chaining object determined by the signal processor further includes processing priorities corresponding to the service processing capacities which the service nodes need to provide.

By adopting the above-mentioned technical solutions, the existing PCEP is expanded. By receiving the service chaining object sent by the client device based on the PCEP and the pre-stored service node attribute information, at least one service node matched with the service chaining object in the network is determined, and the service transmission path is generated based on the determined service nodes. In this manner, no manual configuration is needed, the server device automatically generates the service transmission path according to the service chaining object sent by the client device, and subsequently service nodes process the corresponding service according to the service processing capacities which the service nodes are capable of providing by themselves. Compared with the service transmission in a traditional network, the service does not flow through the service nodes in sequence any more, but selectively flow through the service nodes according to the determined service transmission link, thereby well reducing the flow pressure of the service nodes deployed in the network,

DETAILED DESCRIPTION OF THE EMBODIMENTS

Figure 1:
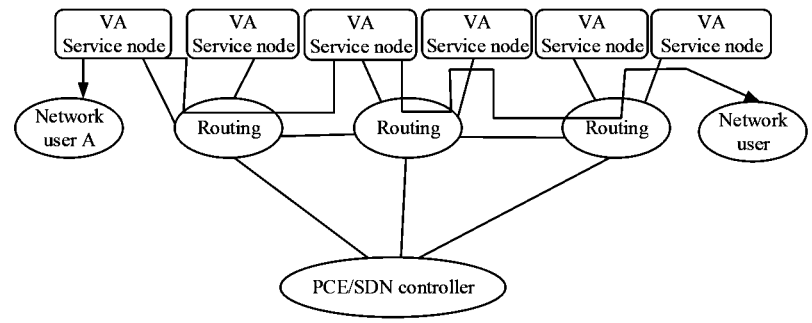
FIG. 1 is a schematic diagram of a service transmission path in a network in general conditions.

For the problems of large flow pressure and low utilization rate of service nodes deployed in a network that could not be well solved when determining a service transmission path generally, in the technical solutions provided by the embodiments of the present disclosure, the existing PCEP is expanded. By receiving the service chaining object sent by the client device based on the PCEP and the pre-stored service node attribute information, at least one service node matched with the service chaining object in the network is determined, and the service transmission path is generated based on the determined service nodes. In this manner, no manual configuration is needed, the server device automatically generates the service transmission path according to the service chaining object sent by the client device, and subsequently service nodes process the corresponding service according to the service processing capacities which the service nodes are capable of providing by themselves. Compared with the service transmission in a traditional network, the service does not flow through the service nodes in sequence any more, but selectively flow through the service nodes according to the determined service transmission link, thereby well reducing the flow pressure of the service nodes deployed in the network, improving the utilization rate of the service nodes and correspondingly improving the service processing efficiency.

A detailed illustration of the main implementation principles, specific implementation manners of the technical solutions provided by the embodiments of the present disclosure and beneficial effects thereof which can be achieved correspondingly will be given below, in combination with accompanying drawings.

Embodiment 1

In order to overcome the defects that the problems of large flow pressure and low utilization rate and low processing efficiency of service nodes deployed in a network could not be well solved when determining a service transmission path, it is proposed to apply a software defined network (SDN), open flow technology and a path computation element (PCE) to a solution of determining the service transmission path. When being transmitted in the network, a service customized by a network user are not limited to a data packet and are continuous data packets generally, and thus the service transmitted in the network may also be called a service flow. By means of the SDN and the Open flow technology, the service flows are flexibly and precisely defined and distinguished, an SDN controller or the PCE may flexibly and dynamically control the service flow forwarding behavior of each network node according to the requirements of different service flows, to enable the service flows to only flow through the necessary service nodes according to the requirements so as to reduce the effective flow of the service nodes deployed in the network, improve the utilization rate of the service nodes, reduce the expansion cost of the network and automatically determine the service transmission path according to the service customized by the network user. Accordingly, in the technical solutions provided by the present disclosure, a network provider may provide an interface for the network user customizing the service, for example, the network user may serve as a client device to perform data interaction with a server device through the interface provided by the network provider.

Figure 2:
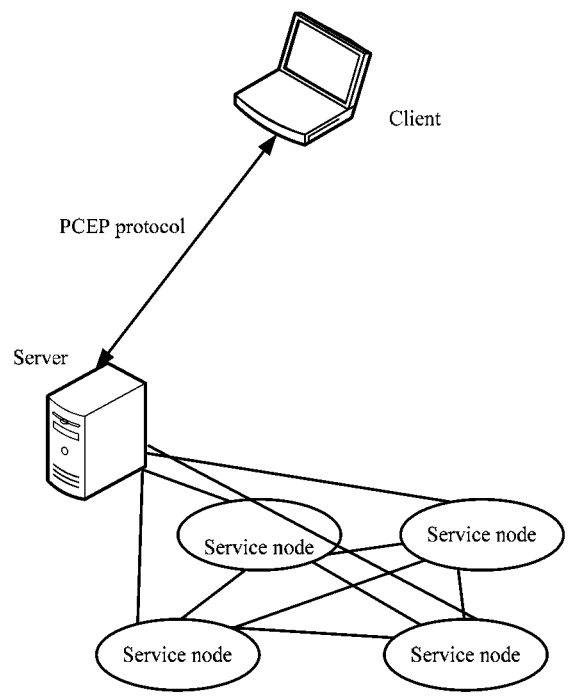
FIG. 2 is a schematic diagram of structure composition of a system for determining a service transmission path provided in embodiment 1 of the present disclosure.

Embodiment 1 of the present disclosure provides a system for determining a service transmission path, as shown in FIG. 2, including a server device and a client device. The client device may be arranged in the network to serve as an independent composition device and may also be integrated in any network element device which the network user in the network can access to serve as an integrated module. The server device may be arranged in the network to serve as an independent composition device and may also be integrated in any network element device to serve as an integrated module. For example, the server device may be arranged in a PCE to serve as an integrated module, or may be arranged in a controller provided by the network provider to serve as an integrated module. A detailed illustration will be given in embodiment 1 of the present disclosure by taking it as an example that the server device is arranged in the network to serve as an independent network element device.

The server device obtains network topology information and obtains service node attribute information in different network topologies. The network topology information may include a distributed-control network topology or a centralized-control network topology. Each network topology includes at least one service node, and for each service node in the at least one service node in the network, the server device obtains the service node attribute information of the service node.

The service node attribute information may be node identifiers of service nodes in the network, the service processing capacities which the service nodes are capable providing, etc. Specifically, the node identifiers may be the addresses of the service nodes in the network, and may also be the device identifiers of the service nodes or the serial numbers of the service nodes. If the node identifiers are the device identifiers of the service nodes or the serial numbers of the service nodes, the service node attribute information further includes the addresses of the service nodes in the network.

The server device may obtain the service node attribute information in one or multiple of the following manners:

A first manner: the server device passively obtains the service node attribute information in the network.

The server device receives service nodes' own attribute information sent by the service nodes in the network based on a routing protocol. The service nodes flood such attribute information as service processing capacities which they are capable of providing, addresses in the network, their own node identifiers and the like to the server device through such routing protocols as an expanded intermediate system to intermediate system (ISIS) protocol or an open shortest path first (OSPF) protocol and the like, and the server device stores the received service node attribute information of the service nodes.

The manner belongs to that the server device passively obtains the service node attribute information. When sending the service node attribute information to the server device, a service node needs to expand a new type length value (TLV) in the existing routing protocol, and sends the service node attribute information to the server device by including the service node attribute information in the expanded TLV.

A second manner: the server device actively obtains the service node attribute information in the network.

The server device obtains the service node attribute information of the service nodes based on an automatic configuration protocol. The server device may obtain the service node attribute information of the service nodes arranged in the network through such automatic configuration protocols as a dynamic host configuration protocol (DHCP) or neighbor discovery protocol (NDP), etc.

A third manner: the server device obtains the service node attribute information of the service nodes in the network in a pre-configuration manner.

At the early stage of network deployment, the service node attribute information of the service nodes arranged in the network may be written in the server device in the pre-configuration manner.

The client device determines a service chaining object of a service to be transmitted in the network, and sends the determined service chaining object to the server device based on the expanded PCEP. The service chaining object includes service processing capacities which the service nodes need to provide when transmitting the service in the network. Specifically, the client device may send a path computation request message including the service chaining object to the server device based on the expanded PCEP.

In the existing PCEP standard, a variety of path constraint objects necessary for computing the service transmission path have been defined, for example, such objects as a path end point, a path bandwidth and the like are defined. In the technical solutions provided by embodiment 1 of the present disclosure, the existing PCEP standard is expanded, besides including the defined path constraint objects, the service chaining object is further added. The added service chaining object may also be called a service constraint condition and belongs to one of the path constraint objects. The service chaining object may include the service processing capacities which the service nodes need to provide when transmitting the service in the network, and may further include processing priorities corresponding to the service processing capacities which the service nodes need to provide. The processing priorities corresponding to the service processing capacities which the service nodes need to provide indicate the sequential relationship of multiple service nodes which are to process the service. Specifically, the service chaining object may be expressed by a service chaining object table entry, and the service processing capacities which the service nodes need to provide when transmitting the service in the network and the processing priorities corresponding to the service processing capacities which the service nodes need to provide may be correspondingly written in each service chaining object table entry. The service without requirement for processing priorities may be expressed by service chaining object table entries including no processing priority.

The server device receives the service chaining object sent by the client device based on the expanded PCEP, determines at least one service node matched with the service chaining object in the network according to the service processing capacities which the service nodes in the pre-stored service node attribute information are capable of providing, and generates a service transmission path based on the determined service nodes, for transmitting the service initiated by the client device. The server device determines the service processing capacities which the service nodes need to provide when transmitting the service in the network and included in the service chaining object according to the received service chaining object, determines the service nodes meeting the service chaining object from the pre-stored service node attribute information, and generates the service transmission path based on the determined service nodes, for transmitting the service initiated by the client device.

The service chaining object includes the service processing capacities which the service nodes need to provide when transmitting the service in the network. The server device receives a path computation request message sent by the client device based on the expanded PCEP, obtains the service chaining object from the received path computation request message and determines the service processing capacities which the service nodes need to provide when transmitting the service in the network, the server device determines at least one service node matched with the service chaining object in the network from the pre-stored service node attribute information, takes the determined service nodes as nodes through which the path need to pass, namely, converts the network addresses of the determined service nodes into explicit route objects (ERO), and computes a final service transmission path by means of a path computation function in combination with other path constraint objects carried in the PCEP message. The method of the server device for computing the path according to other path constraint objects regulated in the PCEP standard is the prior art, and thus will not be repeated redundantly in embodiment 1 of the present disclosure.

The service chaining object received by the server device may further include the processing priorities corresponding to the service processing capacities which the service nodes need to provide. If the service chaining object received by the server device further includes the processing priorities corresponding to the service processing capacities which the service nodes need to provide, the server device generates the service transmission path based on the processing priorities corresponding to the service processing capacities which the determined service nodes are capable of providing.

In the determined service nodes, when there are multiple service nodes which may provide the same service processing capacity, the server device generates the service transmission path used for transmitting the service in at least one of the following manners:

a first manner: a shortest path principle, which is specifically as follows: for each service node in the service nodes providing the same service processing capacity, respectively computing the shortest path passing through the service node and the distance thereof, and comparing all the computed distances of the shortest paths to select the path with the shortest distance as the service transmission path;

a second manner: a load balance principle, which is specifically as follows: respectively selecting a service node with the minimum load according to the load of each service node providing the same service processing capacity, and generating the service transmission path based on the selected service node.

After generating the service transmission path, the server device may determine a node identifier corresponding to each service node included in the generated service transmission path according to the service node attribute information, and start a service path establishment process. Due to the different network topologies, the specific processing of the server device for starting the service path establishment process may include the following two conditions:

A first condition: for the network with a distributed-control network topology, a signaling process may be started by a head service node of the service transmission path, in order to establish a forwarding label switched path (LSP) or other message transmission tunnels.

For example, taking it as an example that the generated service transmission path is N1-N2-N3-N4-N5, the head service node of the service transmission path is N1, and the signaling process may be started by the N1, for example, starting a resource reservation protocol (RSVP) to establish the service transmission path.

A second condition: for the network with the centralized-control network topology, each service node in the service transmission path may be configured in turn according to the generated service transmission path by means of a centralized-control network element device.

For example, supposing that the centralized-control network is an SDN network or a Stateful PCE network, and the centralized-control network element device is an SDN controller or a PCE, the SDN controller or the PCE configure each service node in the service transmission path in turn according to the generated service transmission path.

The client device transmits the initiated service on the service transmission path generated by the server device according to the service chaining object.

Figure 3:
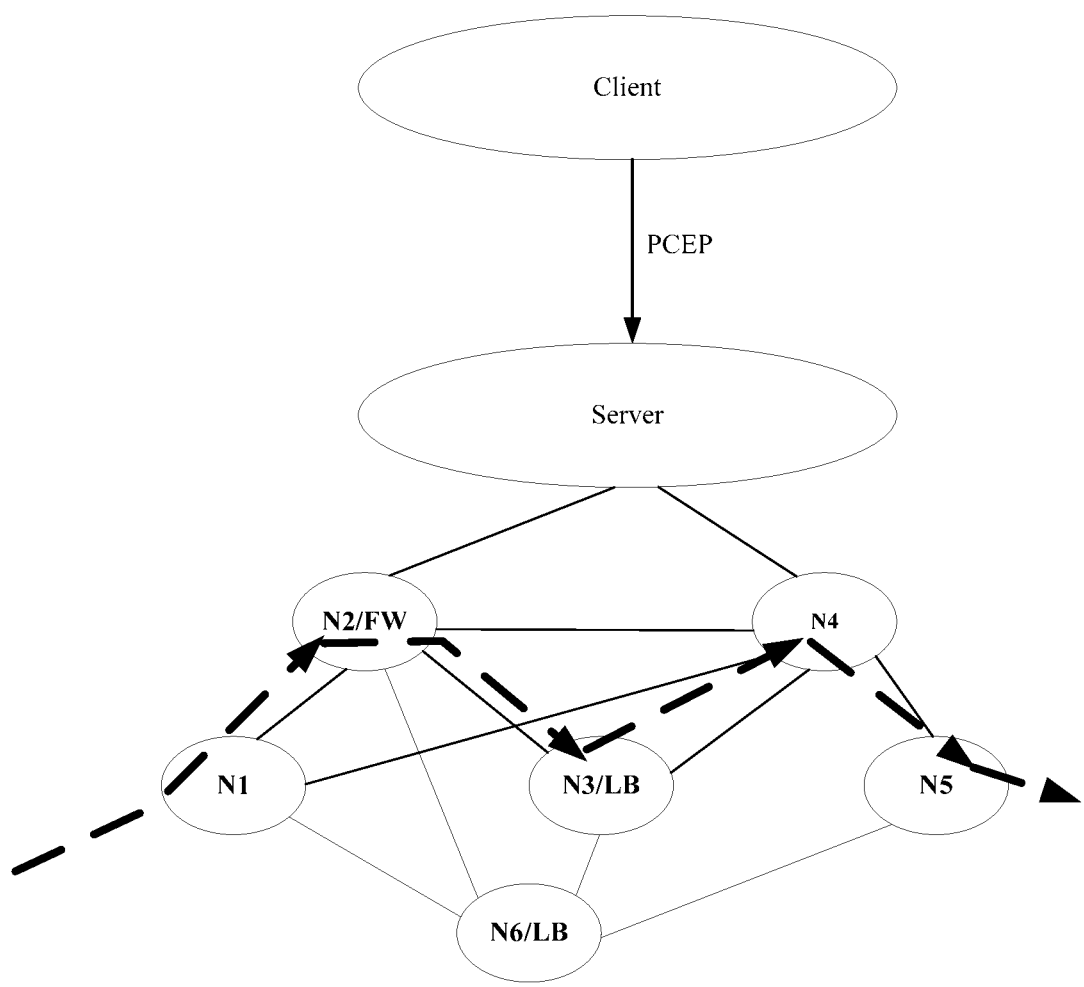
FIG. 3 is a schematic diagram of determining a service transmission path provided in embodiment 1 of the present disclosure.

A detailed illustration will be given below by a specific example. The service processing capacity which service node N2 as shown in FIG. 3 is capable of providing is a firewall service, the service node may be referred to as a firewall service node for short, and N2 may be an address of the firewall service node in the network, or a node identifier of the firewall service node in the network. In the technical solutions provided by embodiment 1 of the present disclosure, a detailed description will be given by taking it an example that the node identifier of the service node is the address of the service node in the network. The service processing capacity which service node N3 as shown in FIG. 3 is capable of providing is load balance, the service node may be referred to as a load balance service node for short, and N3 may be an address of the load balance service node in the network, or a node identifier of the load balance service node in the network. In the technical solutions provided by embodiment 1 of the present disclosure, a detailed description will be given by taking it an example that the node identifier of the service node is the address of the service node in the network. The service processing capacity which service node N6 as shown in FIG. 3 is capable of providing is load balance as well, the service node may be referred to as a load balance service node for short, and N6 may be an address of the load balance service node in the network, or a node identifier of the load balance service node in the network. In the technical solutions provided by embodiment 1 of the present disclosure, a detailed description will be given by taking it as an example that the node identifier of the service node is the address of the service node in the network. The other service nodes as shown in FIG. 3 are routing nodes. Supposing that the server device has obtained the network topology information and obtained the service node attribute information of the service nodes deployed in the network topology, the service node attribute information obtained by the server device may refer to the table shown at the upper left corner in FIG. 4.

The client device sends the path computation request message based on the expanded PCEP, and the path computation request message mainly includes the following contents:

(1) Requesting computing a transmission path between an initial service node and a terminate service node.

It may be specifically expressed that an end-points object in the PCEP includes that the client device requests computing the transmission path from node N1 to node N5.

(2) Extending the PCEP, where the expanded PCEP further includes the service chaining object.

The path computation request message sent by the client device to the server device based on the expanded PCEP includes the service chaining object. As shown in the table at the upper right corner in FIG. 4, the service chaining object includes the service processing capacities which the service nodes need to provide when transmitting the service in the network and the processing priorities corresponding to the service processing capacities which the service nodes need to provide. Namely, when being transmitted in the network, the service needs to firstly pass through the firewall service node, and then pass through the load balance service node.

Figure 4:
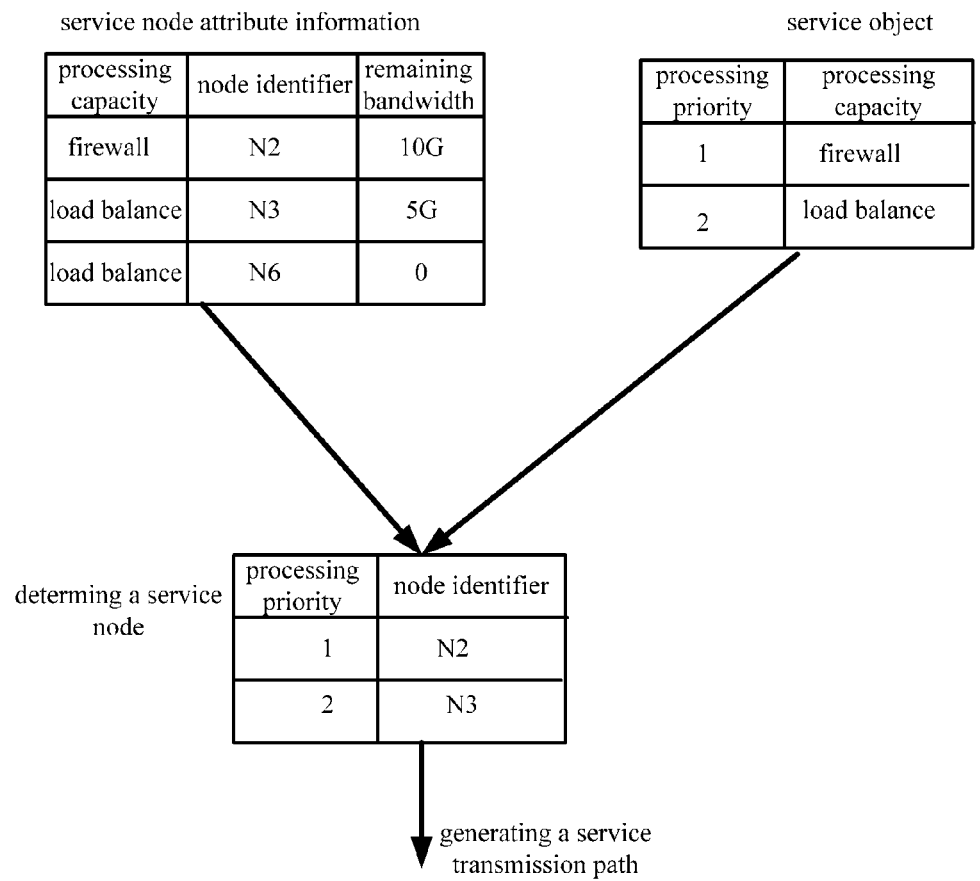
FIG. 4 is a schematic diagram of establishing a mapping relationship between a service and service nodes provided in embodiment 1 of the present disclosure.

The server device receives the path computation request message sent by the client device based on the expanded PCEP, obtains the service chaining object in the received path computation request message, determines at least one service node matched with the service chaining object in the network from the pre-stored service node attribute information, and maps the service processing capacities, which service nodes need to provide when transmitting the service in the network, sent by the client device to the service nodes through which the service need to pass when being transmitted in the network, in order to establish a mapping relationship between the service and the service nodes. This is specifically as shown in FIG. 4. After the mapping relationship between the service and the service nodes is determined, the server device may convert the obtained service chaining object into an explicit route object (ERO), the server device converts service chaining computation into network path computation so as to compute and output the service chaining by means of the PCE-supported explicit path computation method.

When generating the service transmission path, when there are multiple service nodes capable of providing the same service processing capacity in the determined service nodes, for each service node in the service nodes providing the same service processing capacity, determining a length of service transmission path passing through the service node, and generating a service transmission path with the minimum length according to the determined length of each service transmission path; and/or, when there are multiple service nodes capable of providing the same service processing capacity in the determined service nodes, selecting a service node with the minimum load according to a load of each service node providing the same service processing capacity, respectively, and generating the service transmission path based on the selected service node. It may be specifically shown in FIG. 4 that, the service node attribute information pre-stored by the server device includes the load (which may be expressed by remaining bandwidths) of the service nodes, the node identifiers of the service nodes and the service processing capacities which the service nodes are capable of providing. The node identifier of the firewall service node is N2 (illustrated above, and the node identifier is expressed by the address of the service node in the network), and the remaining bandwidth is 10 G. There are two load balance service nodes, and the node identifiers are N3 and N6, respectively. The remaining bandwidths are 5 G and 0, respectively.

According to the obtained service chaining object, the server device determines that the service chaining object includes the service processing capacities which the service nodes need to provide when transmitting the service in the network, and the service chaining object further includes the processing priorities corresponding to the service processing capacities which the service nodes need to provide. Suppose that the processing priority is that the firewall service node is before the load balance service node. From the pre-stored service node attribute information, the server device obtains that the node identifier of the firewall service node is N2 and the remaining bandwidth is 10 G, there are two load balance service nodes, the node identifiers are N3 and N6, respectively, but the remaining bandwidths of the two load balance service nodes N3 and N6 are different, that is, the loads of the two load balance service nodes N3 and N6 are different. Under this condition, the service node capable of providing the same service processing capacity in the network may be selected from multiple service nodes, when determining the service nodes, the server device may select one service node from the multiple service nodes according to a principle of shortest total path of service transmission, or according to a principle of flow load balance. Since the remaining bandwidths of the two load balance service nodes N3 and N6 as shown in FIG. 4 are different: one is 10 G and the other is 0, the loads of the two are different. In a manner, the server device may directly select one load balance service node from the two load balance service nodes without considering the conditions of the remaining bandwidths, and in another manner, the server device selects the load balance service node with the remaining bandwidth of 10 G according to the load balance condition. In embodiment 1 of the present disclosure, the server device selects the load balance service node N3 with the remaining bandwidth of 10 G according to the principle of load balance, and thus the node identifiers of the service nodes corresponding to the service chaining object, which is included in the path computation request message, finally determined by the server device are N2, N3, and the processing priority of the two service nodes is that N2 is before N3. In this way, the computation requirement becomes explicit path computation of "computing a path from N1 to N5 which must firstly pass through N2 and then pass through N3". On the premise of meeting the condition, the server device computes the service transmission path for transmitting the service as N1-N2-N3-N4-N5 by means of the path computation function of the PCE. Subsequently the service sent by the network user flows through the service nodes N1-N2-N3-N4-N5 in turn according to the generated service transmission path.

The network user may transmit the service on the service transmission path generated by the server device.

In the above-mentioned technical solutions provided by embodiment 1 of the present disclosure, in specific implementation, no manual configuration is needed, the server device automatically generates the service transmission path according to the service chaining object sent by the client device, and subsequently service nodes process the corresponding service according to the service processing capacities which the service nodes are capable of providing by themselves. Compared with the service transmission in a traditional network, the service does not flow through the service nodes in sequence any more, but selectively flow through the service nodes according to the determined service transmission link, thereby well reducing the flow pressure of the service nodes deployed in the network, improving the utilization rate of the service nodes and correspondingly improving the service processing efficiency.

Embodiment 2

Figure 5:
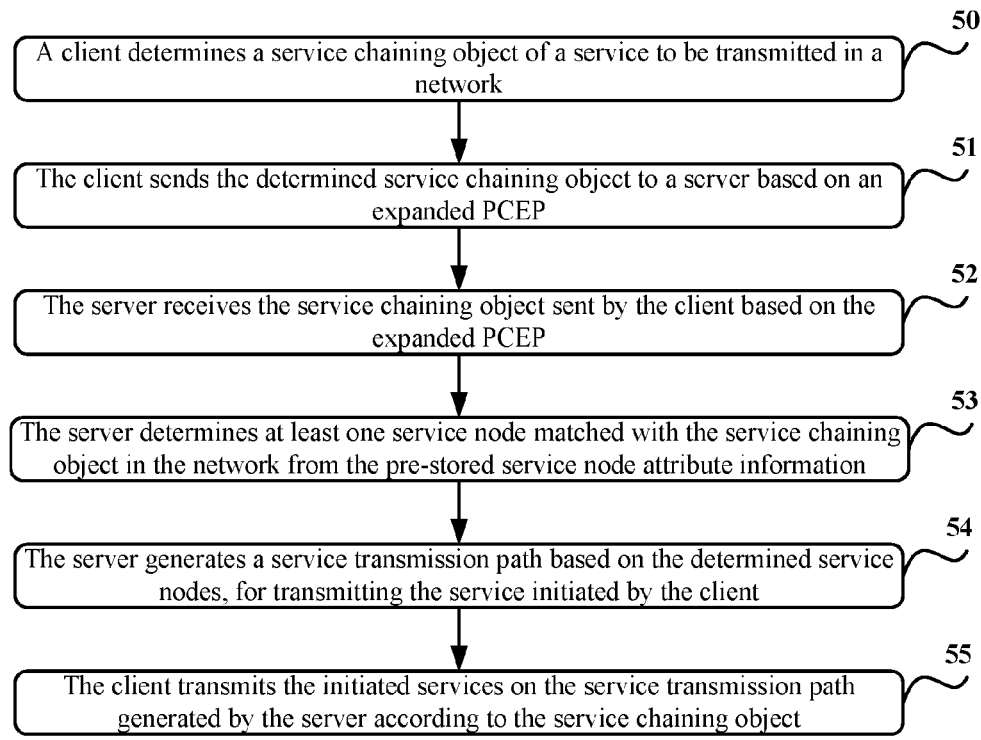
FIG. 5 is a flowchart of a method for determining a service transmission path provided in embodiment 2 of the present disclosure.

Based on the system architecture as shown in FIG. 2, embodiment 2 of the present disclosure provides a method for determining a service transmission path, as shown in FIG. 5, a specific processing flow of the method is as follows:

Step 50, a client device determines a service chaining object of a service to be transmitted in a network.

The service chaining object may include service processing capacities that service nodes need to provide when transmitting the service in the network, and may further include processing priorities corresponding to the service processing capacities which the service nodes need to provide.

Step 51, the client device sends the determined service chaining object to a server device based on an expanded PCEP.

The client device may send a path computation request message including the service chaining object to the server device based on the expanded PCEP.

In the technical solutions provided by embodiment 2 of the present disclosure, an existing PCEP standard is expanded. Besides including the defined path constraint objects, the Service Chaining Object is further added. The added Service Chaining Object may also be called a service constraint condition and belongs to one of path constraint conditions. The service chaining object may include the service processing capacities which the service nodes need to provide when transmitting the service in the network, and may further include the processing priorities corresponding to the service processing capacities which the service nodes need to provide. The processing priorities corresponding to the service processing capacities which the service nodes need to provide indicate a sequential relationship of multiple service nodes which are to process the service.

Specifically, the contents and specific expression manners of the added Service Chaining Object may refer to the detailed description in the above-mentioned embodiment 1, and will not be repeated redundantly in embodiment 2 of the present disclosure.

Step 52, the server device receives the service chaining object sent by the client device based on the expanded PCEP.

The server device receives the path computation request message which may include the Service Chaining Object sent by the client device based on the expanded PCEP, and determines the service processing capacities which the service nodes need to provide when transmitting the service in the network.

Optionally, the server device may also determine the processing priorities corresponding to the service processing capacities which the service nodes need to provide from the Service Chaining Object.

Step 53, the server device determines at least one service node matched with the service chaining object in the network from the pre-stored service node attribute information.

The server device obtains network topology information and obtains service node attribute information included in different network topologies.

The network topology information may include a distributed-control network topology or a centralized-control network topology. Each network topology includes at least one service node, and the server device obtains the service node attribute information of each service node in the at least one service node. The service node attribute information may be node identifiers of the service nodes in the network, the service processing capacities which the service nodes are capable of providing, etc. Specifically, the node identifiers may be addresses of the service nodes in the network, and may also be device identifiers of the service nodes or serial numbers of the service nodes. If the node identifiers are the device identifiers of the service nodes or the serial numbers of the service nodes, the service node attribute information further includes the addresses of the service nodes in the network.

The server device may obtain the service node attribute information in one or multiple of the following manners:

A first manner: the server device passively obtains the service node attribute information in the network.

A second manner: the server device actively obtains the service node attribute information in the network.

A third manner: the server device obtains the service node attribute information of the service nodes in the network in a pre-configuration manner.

Specifically, for the implementation manner of the server device for obtaining the service node attribute information, please refer to the detailed description in the above-mentioned embodiment 1, and it will not be repeated redundantly in embodiment 2 of the present disclosure.

Step 54, the server device generates a service transmission path based on the determined service nodes, for transmitting the service initiated by the client device.

In the determined service nodes, when there are multiple service nodes providing the same service processing capacities, the server device generates the service transmission path used for transmitting the service in at least one of the following manners:

A first manner: a shortest path principle, which is specifically as follows: for each service node in the service nodes providing the same service processing capacity, determining a length of the service transmission path passing through the service node, and generating a service transmission path with the minimum length according to the determined length of each service transmission path.

A second manner: a load balance principle, which is specifically as follows: respectively selecting a service node with the minimum load according to the load of each service node providing the same service processing capacity, and generating the service transmission path based on the selected service node.

After generating the service transmission path, the server device may determine the node identifier corresponding to each service node included in the generated service transmission path according to the service node attribute information, obtain network topology information and start a service path establishment process in the obtained network topology information.

Due to the different network topologies, the specific processing of the server device for starting the service path establishment process may include the following two conditions:

A first condition: for the network with a distributed-control network topology a signaling process may be started by a head service node of the service transmission path, in order to establish an LSP or other message transmission tunnels.

A second condition: for the network with a centralized-control network topology, each service node in the service transmission path may be configured in turn by a centralized-control network element device according to the generated service transmission path.

Due to the different network topologies, for a specific processing of the server device for starting the service path establishment process, please refer to the detailed description in the above-mentioned embodiment 1, and it will not be repeated redundantly in embodiment 2 of the present disclosure.

Step 55, the client device transmits the initiated service on the service transmission path generated by the server device according to the service chaining object.

In the above-mentioned technical solutions provided by embodiment 2 of the present disclosure, in specific implementation, no manual configuration is needed, the server device may automatically generate the service transmission path according to the service chaining object sent by the client device, and subsequently service nodes process the corresponding service according to the service processing capacities which the service nodes are capable of providing by themselves. Compared with the service transmission in a traditional network, the service does not flow through the service nodes in sequence any more, but selectively flow through the service nodes according to the determined service transmission link, thereby well reducing the flow pressure of the service nodes deployed in the network, improving the utilization rate of the service nodes and correspondingly improving the service processing efficiency.

Embodiment 3

Figure 6:
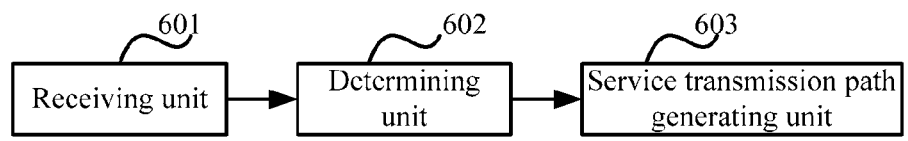
FIG. 6 is a schematic diagram of structure composition of an apparatus for determining a service transmission path provided in embodiment 3 of the present disclosure.

Embodiment 3 of the present disclosure provides an apparatus for determining a service transmission path, as shown in FIG. 6, including:

a receiving unit 601, configured to receive a service chaining object sent by a client device based on an expanded path computation element communication protocol (PCEP) and transmit the service chaining object to a determining unit 602, wherein the service chaining object includes service processing capacities which service nodes need to provide when transmitting a service in a network;

the determining unit 602, configured to obtain the service chaining object transmitted by the receiving unit 601, determine at least one service node matched with the service chaining object in the network according to service processing capacities which service nodes in pre-stored service node attribute information are capable of providing, and transmit the determined service nodes to a service transmission path generating unit;

the service transmission path generating unit 603, configured to obtain the determined service nodes transmitted by the determining unit, and generate a service transmission path based on the determined service nodes, for transmitting the service initiated by the client device.

The service chaining object further includes processing priorities corresponding to the service processing capacities which the service nodes need to provide; the service transmission path generating unit 603 is configured to generate the service transmission path based on the processing priorities corresponding to the service processing capacities which the determined service nodes are capable of providing respectively.

Specifically, the service transmission path generating unit 603 is configured to, when there are multiple service nodes capable of providing the same service processing capacity in the determined service nodes, for each service node in the service nodes providing the same service processing capacity, determine a length of service transmission paths passing through the service node, and generate a service transmission path with the minimum length according to the determined length of each service transmission path; and/or, when there are multiple service nodes capable of providing the same service processing capacity in the determined service nodes, selecting a service node with the minimum load according to a load of each service node providing the same service processing capacity, respectively, and generate the service transmission path based on the selected service node.

Specifically, the service transmission path generating unit 603 is further configured to determine a node identifier corresponding to each service node included in the generated service transmission path according to the service node attribute information; and obtain network topology information; mark and connect the service nodes corresponding to the determined node identifiers in the obtained network topology information.

Figure 7:
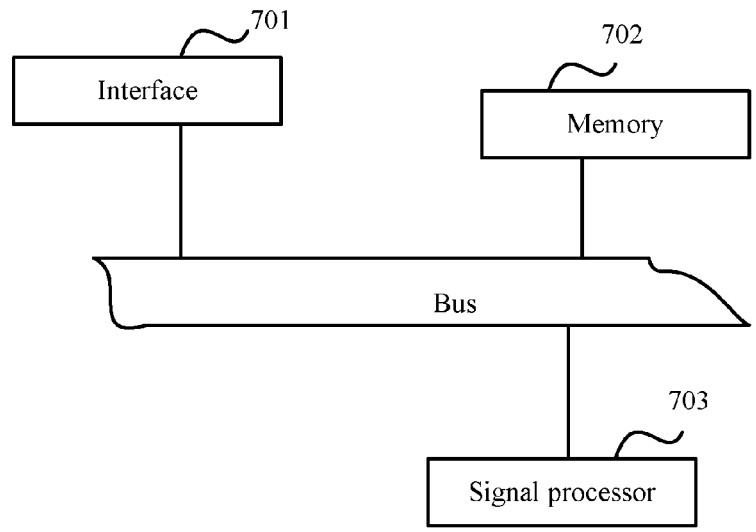
FIG. 7 is a schematic diagram of structure composition of a server device provided in embodiment 3 of the present disclosure.

Correspondingly, embodiment 3 of the present disclosure further provides a server device, as shown in FIG. 7, including an interface 701, a memory 702 and a signal processor 703. The interface 701, the memory 702 and the signal processor 703 are connected and transmit data through a bus. Specifically, its structure composition is as follows:

The interface 701 is configured to receive a service chaining object sent by a client device based on an expanded path computation element communication protocol (PCEP) and transmit the service chaining object to the signal processor 703, wherein the service chaining object includes service processing capacities which service nodes need to provide when transmitting the service in a network.

The interface 701 may be one or multiple of the following: a network interface controller (NIC) providing a wired interface, for example, an Ethernet NIC, and the Ethernet NIC may provide a copper wire and/or an optical fiber interface; an NIC providing a wireless interface, for example, a wireless local area network (WLAN) NIC.

The memory 702 is configured to store a program instruction and transmit the stored program instruction to the signal processor 703. And, the memory 702 is further configured to store the service processing capacities which service nodes in service node attribute information are capable of providing.

The memory may be a volatile memory, for example, a random-access memory (RAM); or a non-volatile memory, for example, a read-only memory (ROM), a flash memory, a hard disk drive (HDD) or a solid-state drive (SSD); or the combination of the above-mentioned memories.

The signal processor 703 is configured to obtain the program instruction stored in the memory 702, obtain the service node attribute information stored in the memory 702 and perform the following operations according to the obtained program instruction: obtaining the service chaining object transmitted by the interface 701, determining at least one service node matched with the service chaining object in the network according to the service processing capacities which the service nodes in the obtained service node attribute information are capable of providing, and generating a service transmission path based on the determined service nodes, for transmitting the service initiated by the client device.

The signal processor 703 may be a central processing unit (CPU) or a combination of CPU and a hardware chip. The signal processor 703 may also be a network processor (NP), or a combination of CPU and NP, or a combination of NP and the hardware chip.

The above-mentioned hardware chip may be one or the combination of multiple of the following: an application-specific integrated circuit (ASIC), a field-programmable gate array (FPGA), and a complex programmable logic device (CPLD).

The service chaining object further includes processing priorities corresponding to the service processing capacities which the service nodes need to provide; the above-mentioned signal processor 703 is configured to generate the service transmission path based on the processing priorities corresponding to the service processing capacities which the determined service nodes are capable of providing respectively.

Specifically, the above-mentioned signal processor 703 is specifically configured to, when there are multiple service nodes capable of providing the same service processing capacity in the determined service nodes, for each service node in the service nodes providing the same service processing capacity, determine length of each service transmission path passing through the service node, and generate a service transmission path with the minimum length according to the determined lengths of the service transmission paths; and/or, when there are multiple service nodes capable of providing the same service processing capacity in the determined service nodes, selecting a service node with the minimum load according to a load of each service node providing the same service processing capacity, respectively, and generate the service transmission path based on the selected service node.

Specifically, the above-mentioned signal processor 703 is further configured to determine a node identifier corresponding to each service node included in the generated service transmission path according to the service node attribute information; and obtain network topology information; mark and connect the service nodes corresponding to the determined node identifiers in the obtained network topology information.

Figure 8:
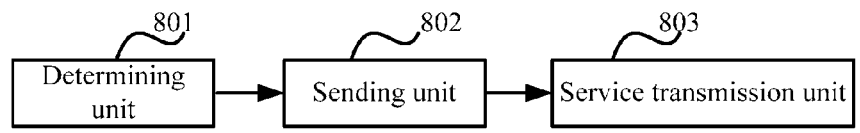
FIG. 8 is a schematic diagram of structure composition of an apparatus for determining a service transmission path provided in embodiment 3 of the present disclosure.

Embodiment 3 of the present disclosure provides an apparatus for determining a service transmission path, as shown in FIG. 8, including:

a determining unit 801, configured to determine a service chaining object of a service to be transmitted in a network, and transmit the determined service chaining object to a sending unit 802, wherein the service chaining object includes service processing capacities which service nodes need to provide when transmitting the service in the network, wherein, the service chaining object determined by the determining unit 801 further includes processing priorities corresponding to the service processing capacities which the service nodes need to provide;

the sending unit 802, configured to obtain the service chaining object transmitted by the determining unit 801, and send the determined service chaining object to a server device based on an expanded path computation element communication protocol (PCEP);

a service transmission unit 803, configured to transmit the initiated service on the service transmission path generated by the server device according to the service chaining object.

Figure 9:
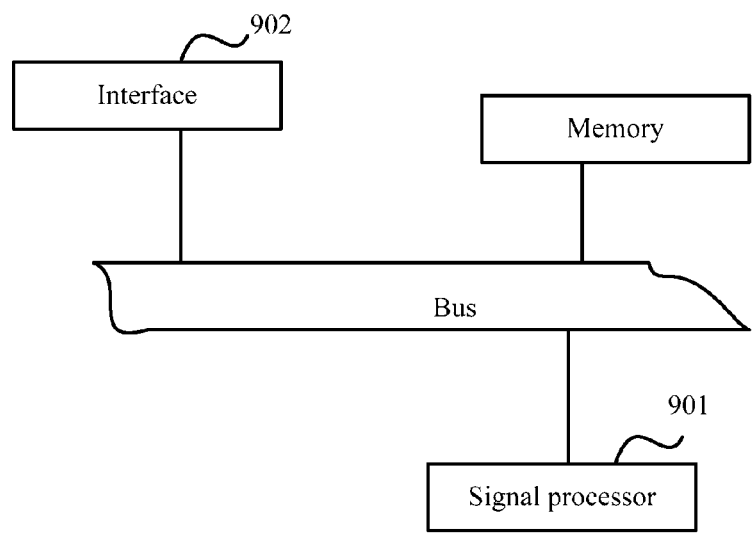
FIG. 9 is a schematic diagram of structure composition of a server device provided in embodiment 3 of the present disclosure.

Correspondingly, embodiment 3 of the present disclosure further provides a server device, as shown in FIG. 9, including a signal processor 901 and an interface 902, wherein the signal processor 901 and the interface 902 are connected and transmit data through a bus. Specifically, its structure composition is as follows:

The signal processor 901 is configured to perform the following operations according to a program instruction: determining a service chaining object of a service to be transmitted in a network and transmitting the determined service chaining object to the interface 902, wherein the service chaining object includes service processing capacities which service nodes need to provide when transmitting the service in the network, and transmitting the initiated service on the service transmission path generated by the server device according to the service chaining object.

The service chaining object determined by the signal processor 901 further includes processing priorities corresponding to the service processing capacities which the service nodes need to provide.

The signal processor 901 may be a CPU or a combination of the CPU and a hardware chip. The signal processor 901 may be an NP, or a combination of CPU and NP, or a combination of NP and the hardware chip.

The above-mentioned hardware chip may by one or the combination of multiple of the following: ASIC, FPGA, CPLD.

Optionally, under the condition that the signal processor 901 is the CPU or the combination of the CPU and the hardware chip, a relay may further include a memory, and the memory is configured to store a program code. The signal processor obtains the stored program code from the memory and performs corresponding processing according to the obtained program code.

The memory may be a volatile memory, for example, an RAM. Or, the memory may be a non-volatile memory, for example, an ROM, a flash memory, a hard disk drive or an SSD; or the combination of the above-mentioned memories.

The interface 902 is configured to obtain the service chaining object transmitted by the signal processor 901 and send the determined service chaining object to the server device based on an expanded path computation element communication protocol (PCEP).

The interface 902 may be one or multiple of the following: an NIC providing a wired interface, for example, an Ethernet NIC, and the Ethernet NIC may provide a copper wire and/or an optical fiber interface; an NIC providing a wireless interface, for example, a WLANNIC.

Those skilled in the art should understand that, the embodiments of the present disclosure may be provided as a method, an apparatus (device) or a computer program product. Therefore, the present disclosure may adopt the forms of complete hardware embodiments, complete software embodiments or combined embodiments of software and hardware. Moreover, the present disclosure may adopt the form of a computer program product implemented on one or multiple computer usable storage media (including, but not limited to, a disk storage, a CD-ROM, an optical memory or the like) including computer usable program codes.

The present disclosure is described in accordance with the flowchart and/or block diagram of the method, the apparatus (device) and the computer program product in the embodiments of the present disclosure. It should be understood that, computer program instructions may achieve each flow and/or block in the flowchart and/or block diagram and the combination of the flows and/or blocks in the flowchart and/or block diagram. These computer program instructions may be provided to a general purpose computer, a special-purpose computer, an embedded processor or processors of other programmable service processing devices to generate a machine, such that the instructions executed by the computers or the processors of the other programmable service processing devices generate apparatuses used for achieving appointed functions in one flow or multiple flows of the flowchart and/or one block or multiple blocks of the block diagram.

These computer program instructions may also be stored in a computer readable memory capable of guiding the computers or the other programmable service processing devices to work in particular manners, such that the instructions stored in the computer readable memory generate products including instruction apparatuses, and the instruction apparatuses achieve the appointed functions in one flow or multiple flows of the flowchart and/or one block or multiple blocks of the block diagram.

These computer program instructions may also be loaded onto the computers or the other programmable service processing devices, to execute a series of operation steps on the computers or the other programmable service processing devices to produce processing achieved by the computers, such that the instructions executed on the computers or the other programmable service processing devices provide steps used for achieving the appointed functions in one flow or multiple flows of the flowchart and/or one block or multiple blocks of the block diagram.

Although the preferred embodiments of the present disclosure have been described, those skilled in the art may make additional variations and modifications to these embodiments once learning the basic inventive concepts. Therefore, the appended claims are intended to be explained as including the preferred embodiments and all variations and modifications within the scope of the present disclosure.

Apparently, those skilled in the art may make various variations and modifications to the present disclosure without departing from the spirit and scope of the present disclosure. In this way, if these modifications and variations of the present disclosure belong to the scope of the claims of the present disclosure and the equivalent technologies thereof, then the present disclosure is intended to encompass these modifications and variations.

What is claimed is:

1. A method for determining a service transmission path, comprising:
receiving a service chaining object sent by a client device based on path computation element communication protocol (PCEP) extensions, wherein the service chaining object includes service processing capacities that service nodes need to provide when transmitting a service in a network;

determining at least one service node matched with the service chaining object in the network according to service processing capacities that service nodes in pre-stored service node attribute information are capable of providing; and generating a service transmission path based on the determined service nodes, for transmitting the service initiated by the client device;

wherein the service chaining object further includes processing priorities corresponding to the service processing capacities that service nodes need to provide; and wherein the generating the service transmission path based on the determined service nodes comprises generating the service transmission path based on the processing priorities corresponding to the service processing capacities that the determined service nodes are capable of providing, respectively.

2. The method of claim 1, wherein the generating the service transmission path based on the determined service nodes comprises:

in response to determining that there are multiple service nodes capable of providing the same service processing capacity in the determined service nodes, for each service node in the service nodes providing the same service processing capacity, determining a length of a service transmission path passing through the service node, and generating a service transmission path with the minimum length according to the determined length of each service transmission path.

3. The method of claim 1, wherein the generating the service transmission path based on the determined service nodes comprises:

in response to determining that there are multiple service nodes capable of providing the same service processing capacity in the determined service nodes, selecting a service node with the minimum load according to a load of each service node providing the same service processing capacity, respectively, and generating the service transmission path based on the selected service node.

4. The method of claim 1, wherein after generating the service transmission path, the method further comprises:

determining a node identifier corresponding to each service node included in the generated service transmission path according to the service node attribute information;

obtaining network topology information; and marking and connecting the service nodes which correspond to the determined node identifiers in the obtained network topology information.

5. An apparatus for determining a service transmission path, comprising:

an interface; and a signal processor, wherein the interface is configured to receive a service chaining object sent by a client device based on path computation element communication protocol (PCEP) extensions and transmit the service chaining object to the signal processor, wherein the service chaining object includes service processing capacities that service nodes need to provide when transmitting a service in a network, wherein the signal processor is configured to obtain the service chaining object transmitted by the interface,
determine at least one service node matched with the service chaining object in the network according to service processing capacities that service nodes in pre-stored service node attribute information are capable of providing, and generate a service transmission path based on the determined service nodes, for transmitting the service initiated by the client device, wherein the service chaining object further includes processing priorities corresponding to the service processing capacities that the service nodes need to provide; and wherein the signal processor is configured to generate the service transmission path based on the processing priorities corresponding to the service processing capacities that the determined service nodes are capable of providing respectively.

6. The apparatus of claim 5, wherein the signal processor is configured to, in response to determining that there are multiple service nodes capable of providing the same service processing capacity in the determined service nodes, for each service node in the service nodes providing the same service processing capacity, determine lengths of service transmission paths passing through the service node, and generate a service transmission path with the minimum length according to the determined length of each service transmission path.

7. The apparatus of claim 5, wherein the signal processor is configured to, in response to determining that there are multiple service nodes capable of providing the same service processing capacity in the determined service nodes, selecting a service node with the minimum load according to a load of each service node providing the same service processing capacity, respectively, and generating the service transmission path based on the selected service node.

8. The apparatus of claim 5, wherein the signal processor is further configured to:

determine a node identifier corresponding to each service node included in the generated service transmission path according to the service node attribute information;

obtain network topology information; and mark and connect the service nodes corresponding to the determined node identifiers in the obtained network topology information.

9. An apparatus for determining a service transmission path, comprising:

an interface; and a signal processor, wherein the signal processor is configured to determine a service chaining object of a service to be transmitted in a network, and transmit the determined service chaining object to the interface, wherein the service chaining object includes service processing capacities that service nodes need to provide when transmitting the service in the network, wherein the interface is configured to obtain the service chaining object transmitted by the signal processor, and send the determined service chaining object to a server device based on path computation element communication protocol (PCEP) extensions; and transmit the initiated service on the service transmission path generated by the server device according to the service chaining object;

wherein the service chaining object determined by the signal processor further includes processing priorities corresponding to the service processing capacities that the service nodes need to provide.

10. A system for determining a service transmission path, comprising:
- a server device; and
- a client device,
  - wherein the client device is configured to determine a service chaining object of a service to be transmitted in a network, and send the determined service chaining object to the server device based on path computation element communication protocol (PCEP) extensions, wherein the service chaining object includes service processing capacities that service nodes need to provide when transmitting the service in the network; and transmit the initiated service on the service transmission path generated by the server device according to the service chaining object; and
  - the server device is configured to receive the service chaining object sent by the client device based on the expanded path computation element communication protocol (PCEP), determine at least one service node matched with the service chaining object in the network according to service processing capacities that service nodes in pre-stored service node attribute information are capable of providing, and generate the service transmission path based on the determined service nodes, for transmitting the service initiated by the client device;
  - wherein the service chaining object further includes processing priorities corresponding to the service processing capacities that service nodes need to provide; and
  - wherein the server device is configured to generate the service transmission path based on the processing priorities corresponding to the service processing capacities that the determined service nodes are capable of providing respectively.

11. The system of claim 10, wherein the server device is configured to, in response to determining that there are multiple service nodes capable of providing the same service processing capacity in the determined service nodes, for each service node in the service nodes providing the same service processing capacity, determine lengths of the service transmission paths passing through the service node, and generate a service transmission path with the minimum length according to the determined length of each service transmission path.

12. The system of claim 10, wherein the server device is configured to, in response to determining that there are multiple service nodes capable of providing the same service processing capacity in the determined service nodes, select a service node with the minimum load according to a load of each service node providing the same service processing capacity, respectively, and generate the service transmission path based on the selected service node.

13. The system of claim 10, wherein the server device is further configured to:
- determine a node identifier corresponding to each service node included in the generated service transmission path according to the service node attribute information;
- obtain network topology information; and
- mark and connect the service nodes which corresponds to the determined node identifiers in the obtained network topology information.

* * * * *